July 23, 1935.    A. N. RAYMOND    2,009,239

SPACING DEVICE FOR AUTOMOBILE JACKS

Filed Feb. 6, 1935

ARTHUR N. RAYMOND.
INVENTOR

BY  *W.H.Young.*
ATTORNEY

Patented July 23, 1935

2,009,239

UNITED STATES PATENT OFFICE 2,009,239

SPACING DEVICE FOR AUTOMOBILE JACKS

Arthur N. Raymond, Flushing, N. Y.

Application February 6, 1935, Serial No. 5,251

2 Claims. (Cl. 254—1)

My application relates generally to a mechanism for raising automobiles and particularly to means of positioning the same at the desired location under the axle. I attain the particular purpose by means of a centering plate, a jack and an arm connecting said plate and jack; one of the car wheels is driven onto the said plate to a predetermined point thereon and as a result the jack will be rigidly held in the desired position under the axle. Further objects and advantages will be hereinafter disclosed.

The construction details of the device are explained in the following description in conjunction with the accompanying drawing, wherein.

Figure 1:
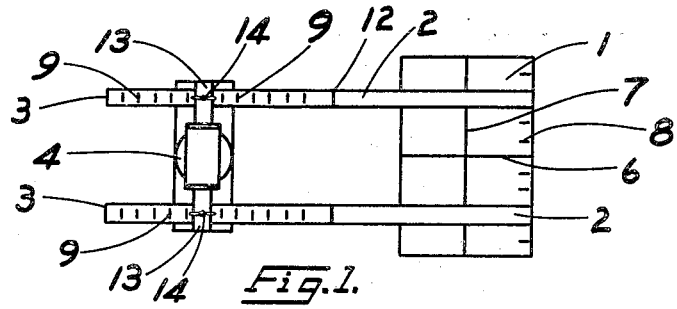
Fig. 1 is a plan view of the jack, centering plate and connecting arms.

Fig. 1 illustrates the complete device attached to the jack 4. The purpose of the plate 1 is to facilitate jacking up the car; the jack 4 is connected to the said plate through the arms 2 and 3; by driving the car wheel onto the plate, after the said plate has been properly positioned on the ground, the jack will be held in its correct location relative to the axle of the car. The plate 1 is shown with center lines 6 and 7. Along the one side of said plate a scale 8 has been provided. The purpose of the said center lines and scale is to provide means whereby the jack may be positioned transversely at a predetermined point under the axle. This is accomplished by placing the device on the ground so that the plate is directly in front of the wheel to be removed and the center line 7 or longitudinal edge of the plate is parallel with the running board or direction of the car, then driving the wheel to be removed along the center line 7 of plate 1 until the center of the hub is directly above the center line 6. In the case of a particular make of car in which the axle has been set forward of the center of the wheel hub, such distance is predetermined and an equal distance is marked off on the scale 8 from the center line 6 of the plate 1. In such a case the car wheel is driven onto the plate 1 so that this mark on the scale 8 is directly below the center of the wheel hub. In the construction described above and illustrated in the drawing, the plate 1 is preferably employed. The plate may be eliminated by a simpler and cheaper construction wherein the arms 2 are made of a single piece and bent into the shape of a U, the base of the said U in cooperation with the arms 2 could then be employed to fulfill the fundamental purpose of the said plate.

Figure 2:
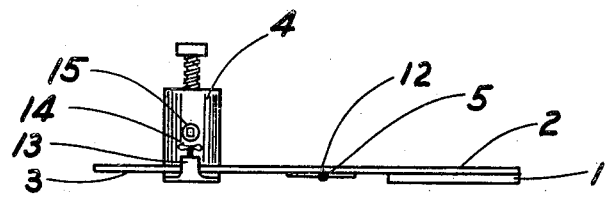
Fig. 2 is a front elevation of the same.
Figures 3, 4:
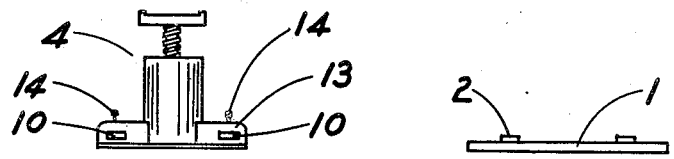
Fig. 3 is a side elevation of the jack.
Fig. 4 is a side elevation of the centering plate and the arms thereon.
Figure 5:
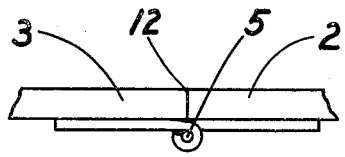
Fig. 5 is an enlarged view of the arms and hinges in a front elevation.

The plate 1 is connected to the jack 4 by means of the arms 2 and 3. At point 12 the arms 2 and 3 meet and are linked together by means of the strap hinge 5 (Figs. 2 and 5). The arms 2 are rigidly fastened to the plate 1 while the arms 3 are adapted to fit holes 10 (Fig. 3) and be retained therein by means of the wing nuts 14. When the car wheel is driven on the plate 1 the pressure thereon is communicated through the parallel arms 2 and 3 to hold the jack firmly against the ground. However, in some cases where the ground is irregular below the plate the tendency of the wheel pressure on the plate would be to raise the jack rather than hold the jack base firmly on the ground; as a matter of fact if the parallel arms 2 and 3 were constructed as one rigid piece the jack would be actually raised under similar circumstances and probably hit by the axle and displaced or injured thereby. To prevent this the linkage between the plate and jack is broken at point 12 to form two arms (2 and 3) which are pivotally connected together through hinge 5. Another feature is shown in Fig. 5 wherein it is apparent that the arms 2 and 3 may be rotated about pivot 5 in one direction only, through an angle of 180 degrees; the upper point of contact 12 (Fig. 5) of the arms 2 and 3 prevents rotation in the reverse direction and therefore causes arms 2 and 3 to function as a single rigid piece when pressure is exerted on the upper surface of the plate 1. Although the preferential construction described above incorporates two pairs of parallel arms 2 and 3, the fundamental principle of the device fully applies to a construction employing merely a single rigid arm connecting the centering plate and the jack.

A further feature of the device is the means of adjusting the position of the jack along the axle to a point at a predetermined distance from the wheel where the lifting force is to be applied. This is accomplished by means of the scale 9 on arms 3 (Fig. 1); similar to the method of employing the scale on the plate in locating the jack transversally under the axis of the axle as above described, the scale 9 on arms 3 (Fig. 1) are employed in positioning the jack longitudinally under the axle at a predetermined distance from the wheel. The jack 4 is then moved along the scale 9 to the desired location and then clamped in position by the wing nuts 14. By referring to Fig. 2 the jack handle connection 15 (Fig. 2) is shown pointing forward as would be the case when the right front wheel was on the plate. In order to make the connection 15 accessible when the plate 1 is located under the left wheel the jack 4 may be reversed on the arms 3 since the said arms and holes 10 are of the same size.

The scales located on the plate 1 and arms 2 as above described, are provided in anticipation of employing the device on a jack adapted to be used universally on all makes of cars. In the usual case, wherein a jack is supplied as standard equipment on a car, the scale may be reduced to a single mark designating the correct position for the jack in reference to the particular make of car. When the jack is sold merely as an accessory for any make of car, a chart will be supplied wherein the various makes and models of cars are listed with the proper scale settings of the device for each particular make.

It will be observed by referring to Fig. 2 that the bottom surface of the plate 1, the lowest point of the hinge 5 and the base of the jack 4 are in alinement whereby the said plate, hinge and jack will all bear upon the ground. Another feature of the construction wherein the arms 2 are rigidly fastened to the upper surface of the plate 1 is to prevent the device from tipping as would occur to a high degree if the arms 2 were normally fastened to the bottom of the plate. Another feature is that it may be stored in a small space by folding the device at point 12 by means of hinge 5.

I claim:

1. A device of the type described comprising a centering plate including means for indicating the correct position of the automobile wheel on the plate where the axle may readily be positioned directly above the jack, one or more arms rigidly fastened at one end to the upper side of said plate, a jack base, means for detachably connecting the other end of said arms to said jack base, means whereby the position of the jack base may be reversed and means whereby such position may be adjusted on said arms, means whereby the correct position of the jack base on said arms can be determined, each arm comprising two parts, and pivotal means for linking the two parts of each arm together whereby the jack base will always rest firmly on the ground and never be raised by the wheel pressure on the plate.

2. A device of the type described comprising a centering plate, one or more arms rigidly fastened at one end to said plate and detachably connected to a jack base at the other end, each arm comprising two parts, and means for linking the two parts of each arm together whereby the jack base will always rest firmly on the ground and never be raised by the wheel pressure on the plate.

ARTHUR N. RAYMOND.